May 23, 1933.  C. C. SUNDERLAND  1,910,269
COMPRESSION JOINT AND METHOD OF MAKING THE SAME
Filed Jan. 30, 1931
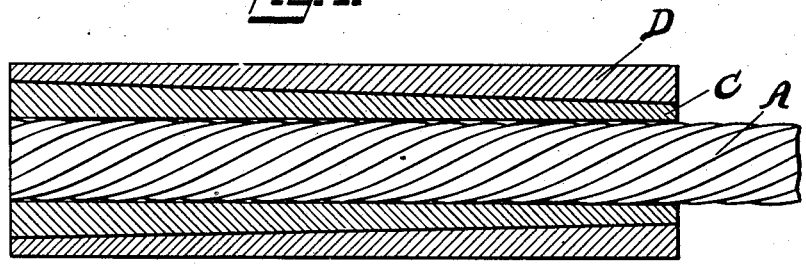
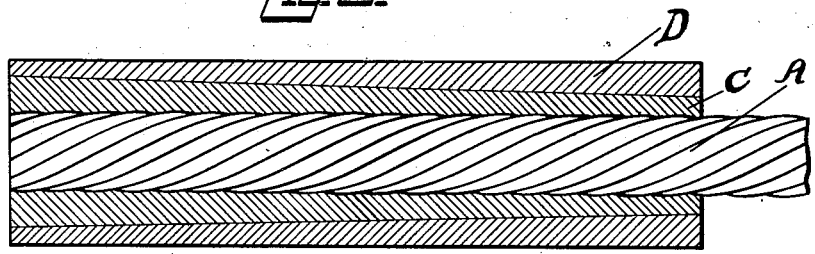
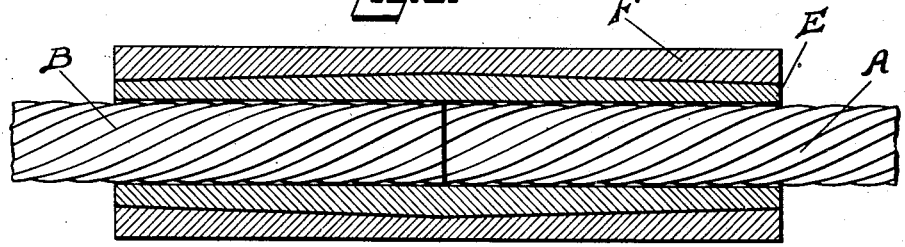
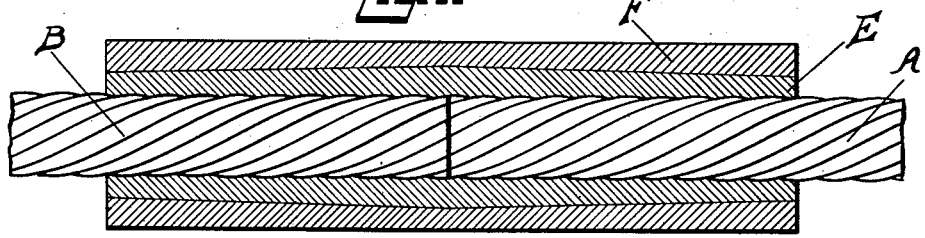

Patented May 23, 1933

1,910,269

UNITED STATES PATENT OFFICE

CHARLES C. SUNDERLAND, OF NEW BRUNSWICK, NEW JERSEY, ASSIGNOR TO JOHN A. ROEBLING'S SONS COMPANY, OF TRENTON, NEW JERSEY, A CORPORATION OF NEW JERSEY

COMPRESSION JOINT AND METHOD OF MAKING THE SAME

Application filed January 30, 1931. Serial No. 512,459.

This invention relates to an improved wire connection of that class in which a sleeve is compressed down upon a wire or cable to form a terminal or upon two wire ends to be connected, and is adapted especially for use with wires under heavy strain, as for instance, wires to be laid in parallel cables of suspension bridges.

The especial object of the present invention is to provide an improved method of making such connection which shall be cheap and efficient and require no special care in its making and to provide a novel form of connection which shall develop the full strength of the wire and be of high efficiency. A further object of the invention is the production of a connection requiring less pressure in its formation, thereby materially reducing the wear on the dies and the number of dies required.

In the accompanying drawing forming a part of the specification, there are shown two constructions embodying the invention in preferred forms and these constructions and the method of making them will now be described in detail and the features forming the invention then be specifically pointed out in the claims.

In the drawing:

Figure 1 is a sectional side elevation of a terminal and wire prior to compression of the sleeves forming the terminal;

Figure 2 is a similar view showing the completed joint;

Figures 3 and 4 are views similar to Figures 1 and 2, showing the invention as applied in connecting two wires.

Referring to the drawing, and now especially to Figures 1 and 2, the wire end A, to which the terminal is to be connected, is shown as a strand formed of spirally laid wires, but may be a single wire, in which case it may be formed with projections or serrations in any suitable manner, as by screw threading it. A sleeve or nipple C is then slipped upon the wire end A, this sleeve C being tapered on its outer surface. The sleeve C preferably is then compressed upon the wires, and an outer sleeve D, tapered in the opposite direction, applied outside the sleeve C and compressed upon the sleeve C. The compression may be in any suitable manner, as by hydraulic pressure or by swaging. The sleeve C is preferably of softer metal than the sleeve D and, while the joint is preferably formed by first compressing the sleeve C upon the wire end and then applying and compressing the sleeve D, both sleeves may be applied before compression as shown in Figure 1 and then compressed together upon the wire end without first compressing the sleeve C. The sleeves C, D, form the terminal and the outer sleeve D may be screw threaded on its outer surface or otherwise provided with suitable means for attachment as desired.

The use of two sleeves, tapered in opposite directions, is found in practice to aid in securing a strong joint in manufacture, and in use increase of tension on the wire A has a tendency to create an increased pressure on the inner sleeve due to the wedging action of the outer sleeve thereon. The use of the softer metal in the inner sleeve, also, especially with the inner sleeve first compressed upon the rope, and the outer harder sleeve then compressed upon the inner sleeve, aids materially in securing the desired strength of the joint.

The invention may be applied, also in connecting two wires, A, B, as in Figures 3 and 4, and in this case each of the sleeves E, F, will be tapered in opposite directions from the center or some point intermediate their ends, as shown. The outer sleeve may be split longitudinally or otherwise formed for application over the sleeve E.

It will be understood that projections or serrations of any form may be used on the inner sleeves, especially if single wires are to be connected, and that other detail modifications in the construction shown may be made without departing from the invention as defined by the claims.

What I claim is

1. The method of making a compressed joint, which comprises compressing upon the part to be connected an inner and an outer sleeve, the inner sleeve having a taper on its outer surface before compression and the outer sleeve having an opposite taper on its inner surface before compression.

2. The method of making a compressed joint, which comprises compressing upon the metal part to be connected an inner and an outer sleeve, the inner sleeve being made of softer metal than the outer sleeve and having a taper on its outer surface before compression and the outer sleeve having an opposite taper on its inner surface before compression.

3. The method of making a compressed joint, which comprises applying to the metal part to be connected a sleeve having a taper on its outer surface, compressing said sleeve on the metal part, applying on the inner sleeve an outer sleeve having its inner surface tapered oppositely to the inner sleeve and compressing the outer sleeve on the inner sleeve.

4. The method of making a compressed joint, which comprises applying to the metal part to be connected a sleeve having a taper on its outer surface, compressing said sleeve on the metal part, applying on the inner sleeve an outer sleeve of harder metal than the inner sleeve and having its inner surface tapered oppositely to the inner sleeve, and compressing the outer sleeve on the inner sleeve.

5. The method of connecting two wires or other metal parts by a compressed joint, which comprises compressing upon the parts to be connected an inner and an outer sleeve, the inner sleeve being tapered on its outer surface in opposite directions from an intermediate point, and the outer sleeve being tapered on its inner surface in opposite directions to the inner sleeve.

6. The method of connecting two wires or other metal parts by a compressed joint, which comprises compressing upon the parts to be connected an inner and an outer sleeve, the inner sleeve being tapered on its outer surface in opposite directions from an intermediate point, and the outer sleeve being tapered on its inner surface in opposite directions to the inner sleeve, the inner sleeve being made of softer metal than the outer sleeve.

7. A compressed wire joint having an inner and outer sleeve overlapping and compressed upon the two wire ends, the outer surface of the inner sleeve tapering inward from an intermediate point toward the ends of the sleeve and the outer sleeve being tapered on its inner surface in opposite directions to the inner sleeve.

8. A compressed wire joint having an inner and outer sleeve overlapping and compressed upon the two wire ends, the inner sleeve being of softer metal than the outer sleeve, the outer surface of the inner sleeve tapering inward from an intermediate point toward the ends of the sleeve and the outer sleeve being tapered on its inner surface in opposite directions to the inner sleeve.

In testimony whereof, I have hereunto set my hand.

CHARLES C. SUNDERLAND.